(12) United States Patent
Washizu et al.

(10) Patent No.: US 7,612,781 B2
(45) Date of Patent: Nov. 3, 2009

(54) MEMORY CONTROL METHOD OF GRAPHIC PROCESSOR UNIT

(75) Inventors: Yoshinori Washizu, Tokyo (JP); Motoi Kaneko, Tokyo (JP); Sachiyo Aoki, Tokyo (JP); Kaoru Yamanoue, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 620 days.

(21) Appl. No.: 11/231,342

(22) Filed: Sep. 20, 2005

(65) Prior Publication Data

US 2006/0085795 A1    Apr. 20, 2006

(30) Foreign Application Priority Data

Sep. 22, 2004   (JP) ............................. 2004-276236

(51) Int. Cl.
*G06F 12/02* (2006.01)
*G09G 5/39* (2006.01)

(52) U.S. Cl. ..................... 345/543; 345/531
(58) Field of Classification Search ............... 345/543, 345/544, 531; 711/153, 173
See application file for complete search history.

(56) References Cited

U.S. PATENT DOCUMENTS

| | | | | |
|---|---|---|---|---|
| 4,780,708 A * | 10/1988 | Tokumitsu | ................ | 345/567 |
| 5,252,953 A * | 10/1993 | Sandrew et al. | ............ | 345/473 |
| 5,353,404 A | 10/1994 | Abe et al. | | |
| 5,539,893 A * | 7/1996 | Thompson et al. | .......... | 711/122 |
| 5,940,091 A * | 8/1999 | Nakamura | ................. | 345/543 |
| 6,614,438 B1 | 9/2003 | Bru | | |
| 6,664,969 B1 * | 12/2003 | Emerson et al. | ............ | 345/544 |
| 6,720,974 B2 * | 4/2004 | Yoshioka et al. | ............ | 345/610 |
| 6,724,390 B1 * | 4/2004 | Dragony et al. | ............. | 345/543 |
| 6,724,396 B1 * | 4/2004 | Emmot et al. | ............... | 345/587 |
| 6,831,652 B1 * | 12/2004 | Orr | ............................ | 345/543 |
| 6,856,320 B1 * | 2/2005 | Rubinstein et al. | ......... | 345/543 |
| 6,912,000 B1 * | 6/2005 | Shigeta | ................... | 348/222.1 |
| 6,937,244 B2 * | 8/2005 | Hong | ......................... | 345/544 |
| 6,947,050 B2 * | 9/2005 | Jeddeloh | .................... | 345/532 |
| 6,982,719 B2 * | 1/2006 | Deering et al. | ............. | 345/539 |
| 7,081,897 B2 * | 7/2006 | Garg | ......................... | 345/543 |

(Continued)

FOREIGN PATENT DOCUMENTS

| | | |
|---|---|---|
| EP | 0 439 201 | 7/1991 |
| JP | 10-111858 | 4/1998 |
| JP | 11-149570 | 6/1999 |
| JP | 2000-235501 | 8/2000 |
| JP | 2004-505355 | 2/2004 |
| WO | 02/09083 | 1/2002 |

OTHER PUBLICATIONS

International Preliminary Report on Patentability dated Jan. 29, 2007 for corresponding International Application No. PCT/JP2005/016199.

(Continued)

*Primary Examiner*—Ryan R Yang
(74) *Attorney, Agent, or Firm*—Katten Muchin Rosenman LLP

(57) ABSTRACT

A graphic memory is space-divided into a first area and a second area. In the first area, a task corresponding to a predetermined application is executed regardless of which task is processed by a main processor. A switchable area is divided in time so that data related to tasks corresponding to a plurality of applications is sequentially stored in the switchable area in accordance with task switching in the main processor.

6 Claims, 6 Drawing Sheets

U.S. PATENT DOCUMENTS

| | | | |
|---|---|---|---|
| 7,206,003 B2* | 4/2007 | Nose et al. | 345/690 |
| 7,369,134 B2* | 5/2008 | Collins et al. | 345/543 |
| 2002/0070941 A1* | 6/2002 | Peterson et al. | 345/544 |
| 2002/0110351 A1 | 8/2002 | Champion et al. | |

OTHER PUBLICATIONS

International Search Report dated Nov. 24, 2005 from corresponding International Application PCT/JP2005/016199.

Notification of Transmittal dated Dec. 5, 2005 from corresponding International Application PCT/JP2005/016199.

Written Opinion of the International Searching Authority dated Dec. 5, 2005 from corresponding International Application PCT/JP2005/016199.

Notification of Reason(s) for Refusal mailed Jul. 8, 2008, from the corresponding Japanese Application.

Chinese First Office Action dated Feb. 6, 2009, from the corresponding Chinese Application.

Decision of Refusal dated Dec. 2, 2008, from the corresponding Japanese Application.

* cited by examiner

MEMORY CONTROL METHOD OF GRAPHIC PROCESSOR UNIT

BACKGROUND OF THE INVENTION

1. Field of the Invention

The present invention relates to a memory management technique and, more particularly, to a memory management technique in a graphic processor unit.

2. Description of the Related Art

With the development of computer graphics technology in recent years, image data output from information processing apparatuses like a mainframe computer, a personal computer and a game device is becoming more and more complex and advanced. In this background, these information processing apparatuses have a built-in graphic processor unit dedicated to image processing apart from a main processor for ordinary processing, in order to eliminate system overhead by releasing the main processor from image processing.

The main processor in these information processing apparatuses may process a plurality of tasks simultaneously. In association with task switching in the main processor, the graphic processor unit is also required to switch between tasks. An image memory dedicated to image processing in the graphic processor unit is limited in its size. Therefore, when the image memory is shared by a plurality of tasks, it is necessary, in switching from one task to another, to transfer image-related data stored in the image memory to a separate memory area prior to the switching before writing new image-related data in the image memory.

Rewriting of image data in the image memory requires some time. Therefore, in the case of a task in which graphics output in response to the user's operation vary in real time as in a game, the overhead associated with task switching may cause degradation in image quality such as video discontinuity or dropped frames.

SUMMARY OF THE INVENTION

The present invention has been done in view of the aforementioned problems and its object is to provide a memory management method and a graphic processor unit capable of efficient memory management adapted to multitasking.

The present invention according to one aspect provides a memory control method. The memory control method according to this aspect comprises dividing a memory managed by a graphic processor unit into a plurality of areas and differentiating between data related to a plurality of tasks so as to store the differentiated data in the plurality of areas.

The term "task" refers to an application programmed to achieve a given object or contents of information processing included in the application. A task may have direct correspondence with the application. Alternatively, a task may correspond to a unit smaller than the application, such as input and output control or a command designated by a user. The requirement is that a task corresponds to some sort of process or a function unit.

According to this aspect, by allocating space-divided and time-divided areas of the memory to a plurality of tasks appropriately, the memory used by the graphic processor unit can be efficiently shared by the plurality of tasks for use.

It is to be noted that any arbitrary combination or rearrangement of the above-described structural components and so forth are all effective as and encompassed by the present embodiments.

Moreover, this summary of the invention does not necessarily describe all necessary features so that the invention may also be sub-combination of these described features.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 1:
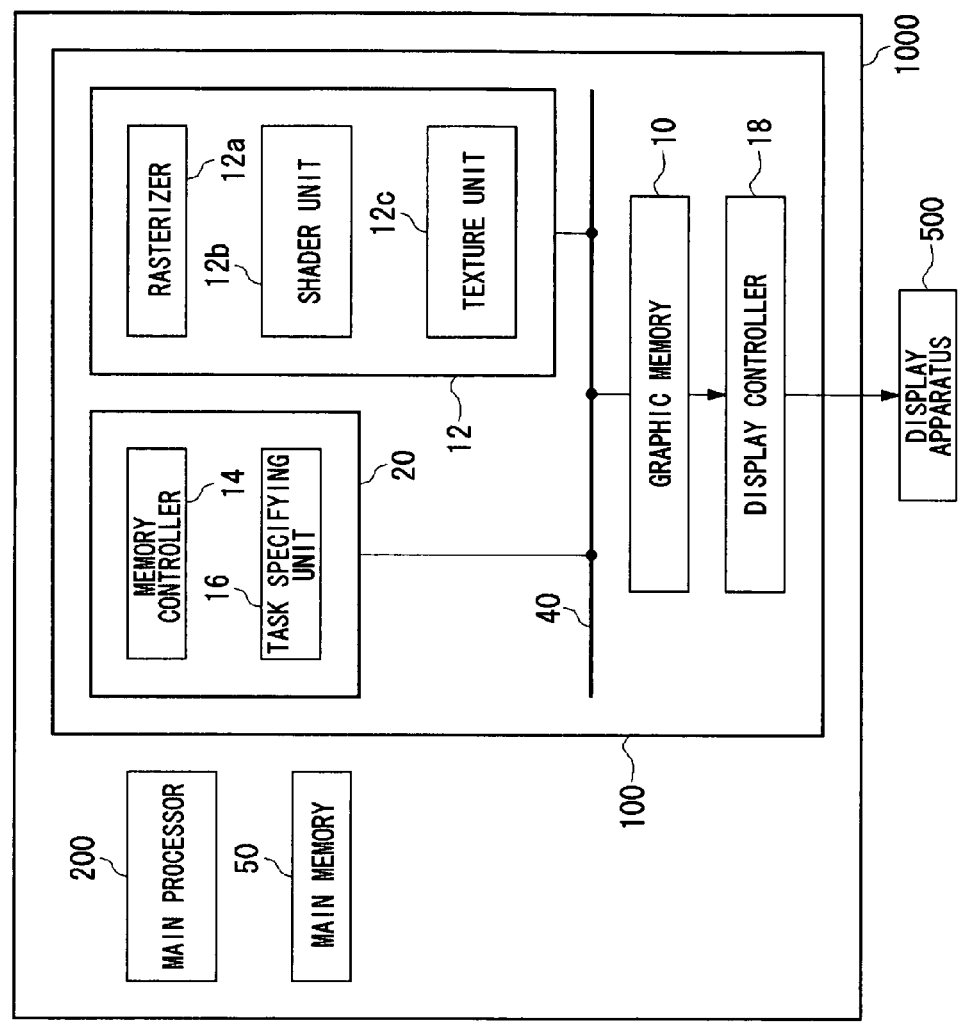
FIG. 1 is a block diagram illustrating the structure of an information processing apparatus according to a first embodiment of the present invention.

FIG. 1 is block diagram illustrating the structure of an information processing apparatus 1000 according to a first embodiment of the present invention. The information processing apparatus 1000 comprises a graphic processor unit 100, a main processor 200 and a main memory 50. The information processing apparatus 1000 is connected to a display apparatus 500 which outputs images and graphics obtained as a result of processing in the main processor 200 and the graphic processor unit 100. The elements illustrated in FIG. 1 as functional blocks executing respective processes are implemented by hardware including a CPU, a memory and an LSI, and by software including a program provided with reservation and management functions and loaded into the memory. Therefore, it will be obvious to those skilled in the art that the function blocks may be implemented by a variety of manners including hardware only, software only or a combination of both.

In the information processing apparatus 1000, an operating system (hereinafter, referred to as an OS), which provides functions and environments in which the information processing apparatus 1000 is efficiently used and which integrally controls the apparatus as whole, is executed. A plurality of software applications (hereinafter, simply referred to as applications) are run on the OS. The information processing apparatus 1000 processes tasks corresponding to the plurality of applications in parallel.

The main processor 200 time-divides the tasks corresponding to the plurality of applications. Parallel processing is achieved by executing, in each time slice, each of the tasks corresponding to the plurality of applications. For example, when a task corresponding to an application processed in a given time slice concerns image processing for three-dimensional computer graphics, the main processor 200 performs an operation such as modeling.

In the first embodiment, the main processor 200 and the graphic processor unit 100 execute operations in an coordinated manner. The graphic processor unit 100 executes image processing related to tasks processed by the main processor 200. The graphic processor unit 100 also outputs images and graphic generated in the process to the display apparatus 500 or stores them in a storage (not shown).

The main memory 50 is a storage area primarily used by the main processor 200. The main memory 50 stores data related to a tasks corresponding to a plurality of applications. For example, modeling data obtained by processing a task related to computer graphics in the main processor 200 is temporarily stored.

As will be described below, the main memory 50 may also store data obtained from operations in the graphic processor unit 100.

The graphic processor unit 100 is a block dedicated to processes related to image and is a unit performing a rendering process, etc. The graphic processor unit 100 comprises a graphic memory 10, an operation unit 12, a display controller 18, a control block 20. These blocks are connected to each other via the bus 40 for transmission and reception of data signals between the blocks.

The graphic memory 10 is a memory area dedicated to graphic-related data used and managed by the graphic processor unit 100. In addition to a frame buffer and a z buffer for storing image frame data, the graphic memory 10 further comprises areas respectively storing vertex data, texture data and a color look-up table, which are basic data referred to when rendering image frame data. The graphic memory 10 is designed with a large bus width at its entry or with a high-speed transfer clock. With this design, the operation unit 12 is capable of accessing data stored in the graphic memory 10 at a high speed.

The operation unit 12 executes various operations related to graphics in accordance with an instruction from the main processor 200. One example of such operations is a series of rendering steps for generating image frame data from three-dimensional modeling data by performing coordinate transform, hidden surface removal and shading, and for writing the generated data in the frame buffer. For high-speed execution of three-dimensional graphics-related processes, the operation unit 12 comprises functional blocks such as a rasterizer 12a, a shader unit 12b and a texture unit 12c.

The rasterizer 12a receives vertex data of a primitive to be rendered and performs a view transform in which a primitive in a three-dimensional space is transformed by projection into a graphic on a rendering plane. Further, the rasterizer 12a performs a rasterizing process in which the graphic on the rendering plane is scanned in the horizontal direction of the rendering plane so as to transform, row by row, the graphic into quantized pixels. The rasterizer 12a develops the primitive into pixels and computes pixel information for each pixel. The pixel information includes RGB color values, an a value indicating transparency and a Z value indicating depth from a view point.

The rasterizer 12a generates a pixel area of a predetermined size along the scan line and outputs the generated area to the shader unit 12b and the texture unit 12c. The pixel area output from the rasterizer 12a is temporarily stacked in a queue. The shader unit 12b sequentially processes pixel areas stacked in the queue.

The shader unit 12b performs a shading process by referring to the pixel information computed by the rasterizer 12a, determines pixel colors after texture mapping by referring to texel information obtained by the texture unit 12c, and writes image frame data after shading in the frame buffer in the graphic memory 10. The shader unit 12b further performs processes like fogging and alpha blending on the image frame data written in the frame buffer so as to determine rendering colors ultimately to be reproduced, and updates the image frame data in the frame buffer.

The texture unit 12c receives parameters designating texture data from the shader unit 12b, reads the requested texture data from a texture buffer in the graphic memory 10. The texture unit 12c performs a predetermined process on the texture data and outputs resultant data to the shader unit 12b.

The control block 20 is a block for controlling the graphic processor unit 100 as a whole and integrally controls the operation unit 12, the graphic memory 10 and the display controller 18. The control block 20 is also provided for management of synchronization of data transfer between the blocks, interrupt processing and timer management.

The control block 20 comprises a memory controller 14 and a task specifying unit 16. The memory controller 14 is a block managing space-division and time-division of the graphic memory 10 described later and is provided with a memory management function of, for example, allocating a memory size or an address to each application. The task specifying unit 16 receives notification for task switching from the main processor 200 and specifies a task to be processed in the graphic processor unit 100.

The display controller 18 generates horizontal and vertical synchronizing signals and sequentially reads pixel data of the image frame data line by line from the frame buffer in the graphic memory 10, in accordance with the timing for display on the display apparatus 500. Further, the display controller 18 transforms the digital pixel data read line by line and comprising R, G and B color values into a format adapted to the display apparatus 500 before outputting the data to the display apparatus 500.

A description will now be given of the operation of the information processing apparatus 1000 with the structure as described above, highlighting the inventive memory management function according to the embodiment.

It will be assumed that the information processing apparatus 1000 is concurrently executing two applications related to a game and video recording, respectively. The game application will be referred to as a first application and associated tasks will be generically referred to as first tasks. Similarly, the video recording application will be referred to as a second application and associated tasks will be generically referred to as second tasks. The main processor 200 processes the first task and the second task in a time-divided manner.

Figure 2:
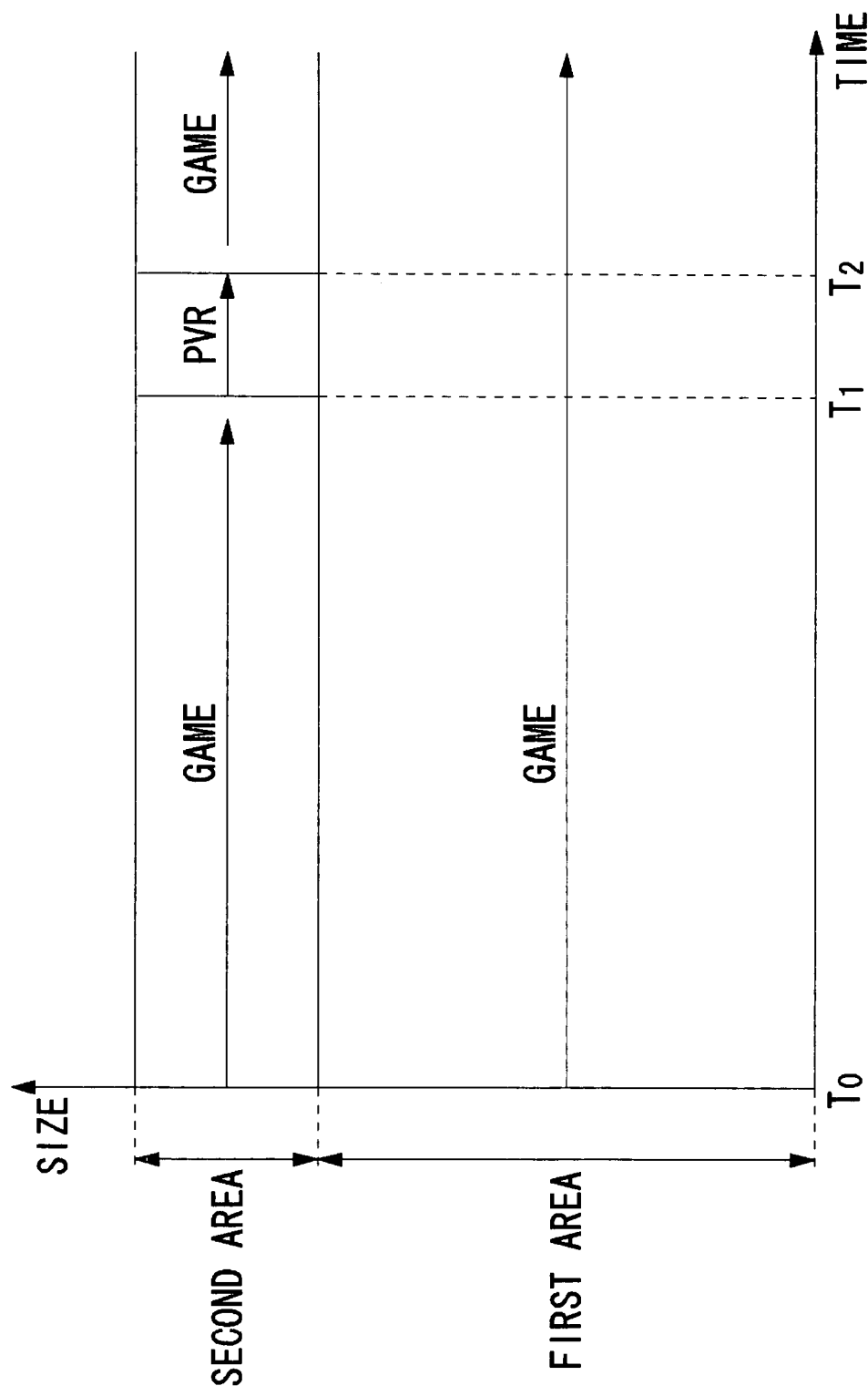
FIG. 2 is a time chart illustrating how a graphic memory is divided in space and time so as to be shared by two applications.

FIG. 2 is a time chart illustrating how the graphic memory 10 is space-divided and time-divided so as to be shared by two applications. FIG. 2 shows time on the horizontal axis and memory size on the vertical axis.

The graphic memory 10 is divided into a first area and a second area for use. The first area is used as a fixed area for storing data related to a predetermined task regardless of whether the task processed in the main processor 200 is changed or not. More specifically, the first area fixedly stores data (GAME) related to the first task corresponding to the first application, regardless of whether the switching between tasks processed in the main processor 200 takes place or not.

The second area is used as a switchable area for storing data related to a task after the change in the main processor 200, in response to task switching in the main processor 200. More specifically, in synchronization with the process in the main processor 200, the second area switchably stores the data (GAME) related to the first task corresponding to the first application or data (PVR) related to the second task related to the second application, in a time-shared manner.

Referring to FIG. 2, in an interval between time T0 and time T1, the main processor 200 is processing the task corresponding to the game application. In this interval, the second area as well as the first area of the graphic memory 10 stores the data (GAME) related to the game.

The application scheduled to have its data stored in the second area specifies whether its data is to be saved upon task switching. This is achieved by using a data save flag FDi (where suffix i indicates an application ID No.) for each application. That the data is to be saved may be indicated by the flag set to 1 and that it is not may be indicated by the flag set to 0. For example, when the saving of data related to the game, the first task, is necessary, FD1=1. When the saving of data related to the video recording, the second task, is not necessary, FD2=0.

The data save flag FDi may be stored in a portion of the graphic memory 10 or the main memory 50. Alternatively, the flag may be supplied from the main processor 200 to the graphic processor unit 100 with each task switching.

At time T1, the main processor 200 switches its subject of processing to the second task corresponding to the video recording application. Concurrently with the task switching, the main processor 200 notifies the task specifying unit 16 of the graphic processor unit 100 of the task change.

The graphic processor unit 100 receiving the notification for the task change refers to the data save flag FDi of the first task. When FD1=1, the graphic processor unit 100 transfer the data stored in the second area to the main memory 50, which is separate from the graphic memory 10. When FD=0, the data stored in the second area is not transferred.

Subsequently, the memory controller 14 clears the entirety of data stored in the second area. When the data is cleared, the memory controller refers to the data save flag FD2 of the second task. When FD2=1, the memory controller reads the data related to the second task from the main memory 50 which had saved in a previous time slice and restores the same in the second area of the graphic memory 10.

When a swap operation involving data save and restoration is completed in the graphic memory 10, the memory controller 14 notifies the main processor 200 that the graphic processor unit 100 is ready for the task change. Upon receipt of this notification, the main processor 200 starts processing the second task corresponding to the second application. In an interval between time T1 and time T2, the data related to the second task is stored only in the second area. The first area is exclusively used by the data related to the first task corresponding to the game application.

At time T2, the main processor 200 switches its process to the first task. The graphic processor unit 100 is notified by the main processor 200 of the task change. The graphic processor unit 100 refers to the data save flag FD2 of the second task so as to save the data if necessary.

Figure 3:
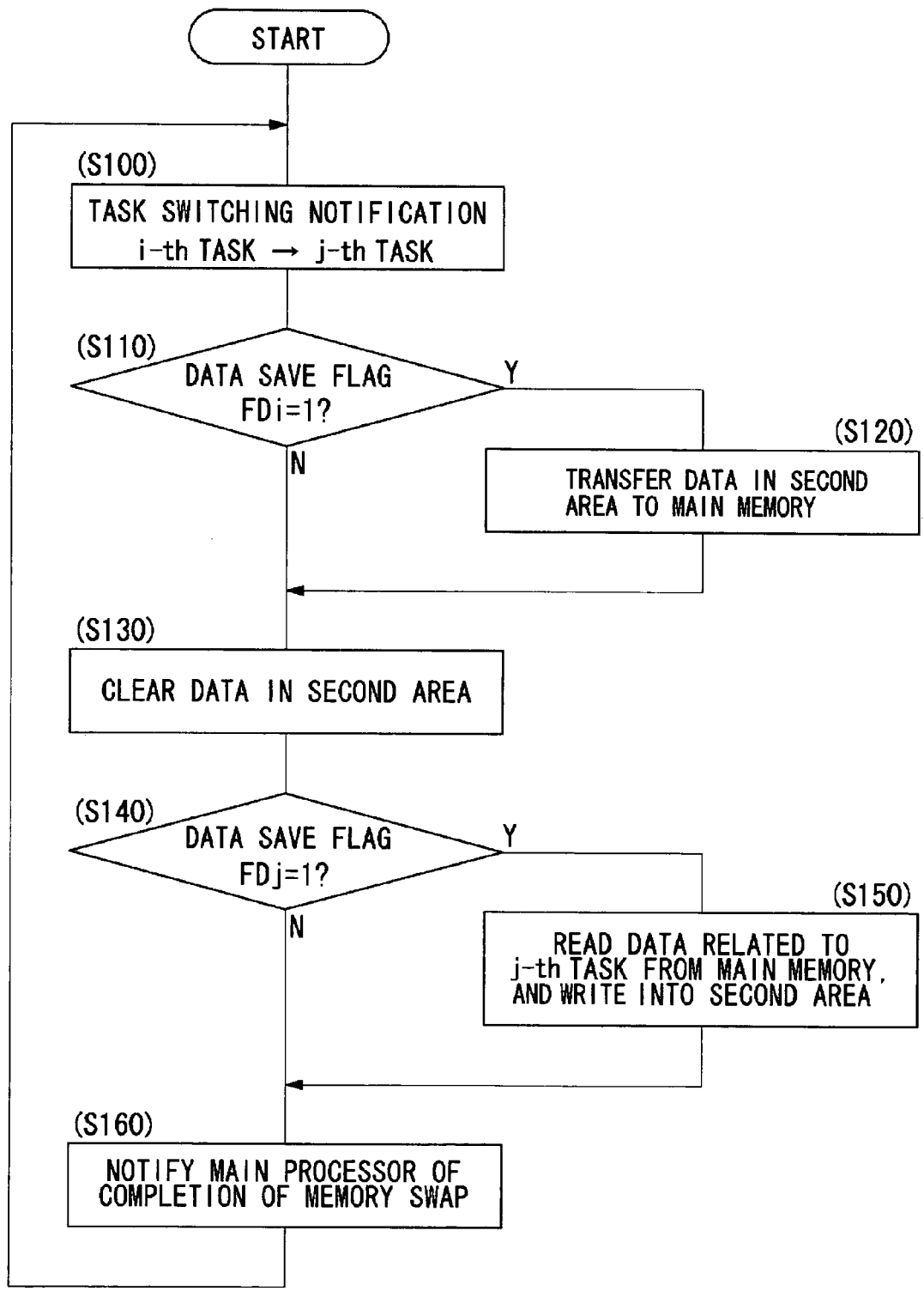
FIG. 3 is a flowchart illustrating a procedure for memory management of a second area by a memory controller.

A series of memory management steps as described above are performed by the memory controller 14. FIG. 3 is a flowchart illustrating a procedure for memory management of the second area by the memory controller 14.

The main processor 200 completes the processing of the i-th task corresponding to the i-th application and notifies the graphic processor unit 100 of a switch to the j-th task (S100). The memory controller 14 refers to the data save flag FDi of the i-th task so as to determine whether the data should be saved (S110) If FDi=1, the memory controller 14 saves the data stored in the second area in the main memory 50 (S120).

The memory controller 14 clears the entirety of data stored in the second area (S130). When the data related to the i-th task has not been saved, the data is deleted. As a result of the data clear, reading of incorrect data between applications is prevented so that it is possible to execute a plurality of applications in a stable manner.

Subsequently, the memory controller 14 refers to the data save flag FDj of the j-th task (S140). If it is found that FDj=1, the memory controller 14 reads the data related to the j-th task saved in the main memory 50 and restores the same in the graphic memory 10 (S150).

The memory controller 14 notifies the main processor 200 of the completion of the series of steps for memory swap operation (S160).

Subsequently, the main processor 200 starts processing the j-th task. The operation unit 12 of the graphic processor unit 100 performs an image process related to the j-th task designated by the main processor 200.

Thus, according to the information processing apparatus 1000 of the embodiment, the graphic memory 10 is divided into the first area and the second area, which are used as a fixed area and a variable area, respectively. This ensures that the data related to the first task stored in the first area used as a fixed area needs not to be saved temporarily, even when task switching occurs in the main processor 200. Therefore, re-reading of the data upon resumption of the task is unnecessary. Accordingly, switching cost is reduced and the system overhead is significantly reduced.

By storing data related to a task requiring a large computation amount and memory size and requiring real-time processing, such as a game application in which three-dimensional graphics are rendered, in the fixed area, problems of degradation of image quality such as video discontinuity and dropped frames are eliminated. This is because the overhead associated with memory swapping does not occur in task switching.

By storing data related to a task such as a video recording application not requiring real time processing, in the second area used as the variable area, the memory can be efficiently shared by a plurality of tasks.

As illustrated in FIG. 2, the data related to the first task allocated to the first area is divided into data stored in the fixed area and data stored in the variable area.

When the game application, the first task, renders three-dimensional graphics, a frame buffer, a z-buffer, a texture buffer, a color look-up table and the like are divided and stored in the first area or the second area. Allocation and storage of data in the first area and the second area may be such as described below.

For example, data like the texture data and the color look-up table may be stored in the fixed area when the data is used in different image frames. Some applications involves relatively less complicated graphics and do not require excessive time for rendering of image frame data. In such a case, the frame buffer and the z-buffer may be stored in the switchable area and the contents of the frame buffer and the z buffer may be discarded. Conversely, when a large computation amount is required to render image frame data or when image frame data of previous frames is required to render given image frame data, the data may desirably be allocated to the fixed area so as to reduce time required for data save and reading. Allocation may be determined in accordance with the type of application and the required specification.

The memory controller 14 determines whether the frame buffer, the z buffer, the texture buffer and the color look-up table related to the first task should be stored in the fixed area or the variable area, in accordance with an instruction from the application. The memory controller 14 retains addresses corresponding to respective areas for storage. The rasterizer 12a, the shader unit 12b and the texture unit 12c in the operation unit 12 write the image frame data, the texel information and the like obtained as a result of operation, in the addresses designated by the memory controller 14. With this, it is ensured that the data are allocated appropriately for storage in the fixed area and the variable area.

Designation of whether the data stored in the second area should be saved may be made for each data stored in the second area instead of designating task by task. For example, when the frame buffer and the texture buffer are stored in the second area, designation may be such that only the texture buffer is saved and the frame buffer is not saved. In this case, only the minimum amount of data is saved, thus facilitating reduction in time required to save and re-read data.

The data saved may be determined depending on whether the data is necessary in a subsequent time slice in which the task is scheduled to be processed. Further, when the time required to generate the same data is shorter than the time to save and restore data, the data needs not to be saved, even when the data is necessary.

Figure 4:
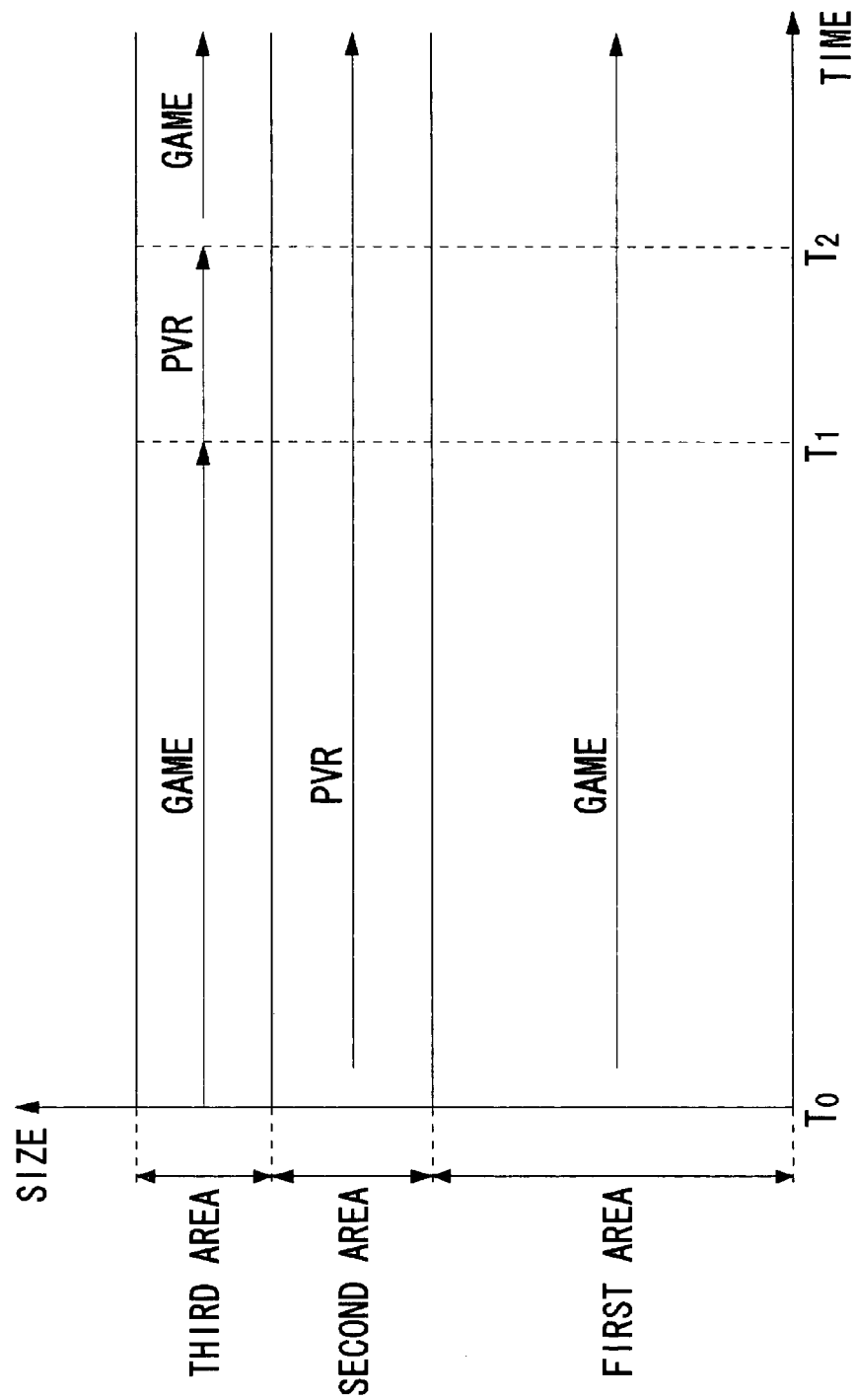
FIG. 4 is a time chart illustrating how a graphic memory is spatially divided into three areas so as to be shared by two applications.

While FIG. 2 illustrates the graphic memory 10 as being divided into the first and second areas, it may be divided into first through third areas as illustrated in FIG. 4. In this case, the first and second areas may be used as fixed areas for the first and second tasks, respectively. The third area may be used as a variable area time-shared by the first and second tasks.

By dividing the graphic memory 10 into three or more areas, a fixed area is reserved not only for the first task but also for the second task. This provides a memory management method that will prove efficient when the second task also requires real time processing.

A description will now be given, by referring to FIGS. 5 and 6, of a procedure for division and allocation of the graphic memory 10 when applications related to a plurality of tasks are started.

Figure 5:
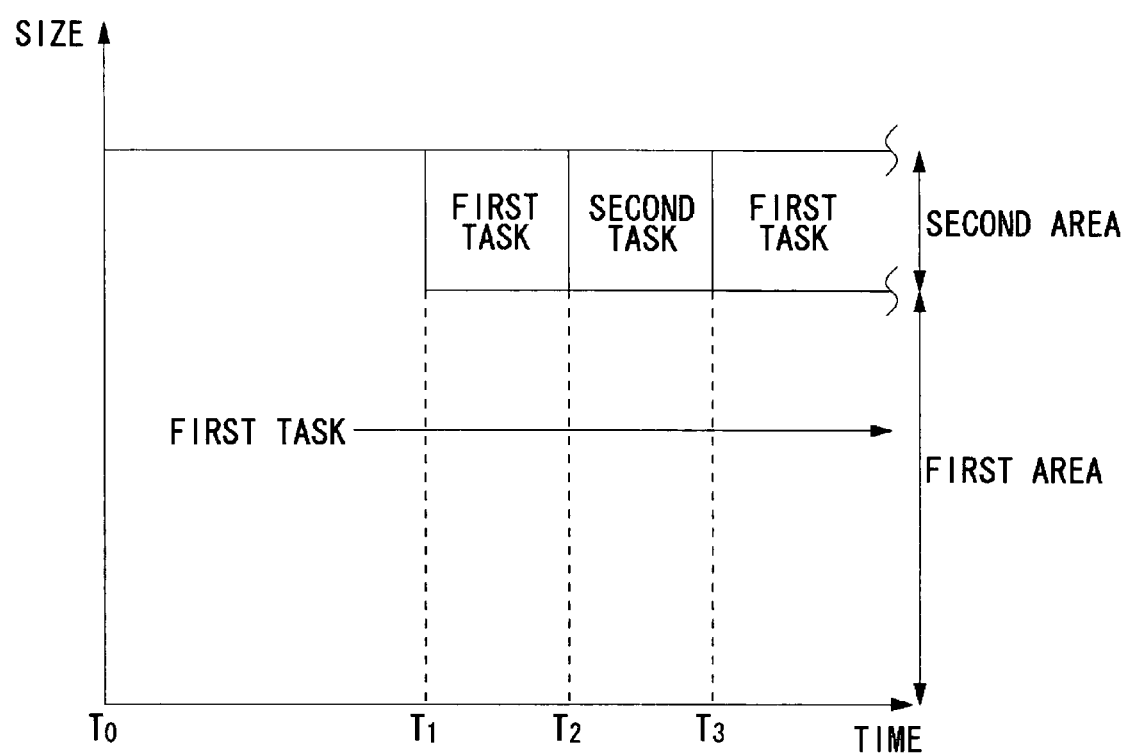
FIG. 5 is a time chart illustrating state transition in which the graphic memory is divided in space and time as a plurality of applications are sequentially started.

FIG. 5 is a time chart illustrating state transition in which the graphic memory 10 is space and time divided as a plurality of applications are sequentially started. Referring to FIG. 5, the notation "X-th task" indicates a state in which data related to a task corresponding to the X-th application is stored.

Figure 6:
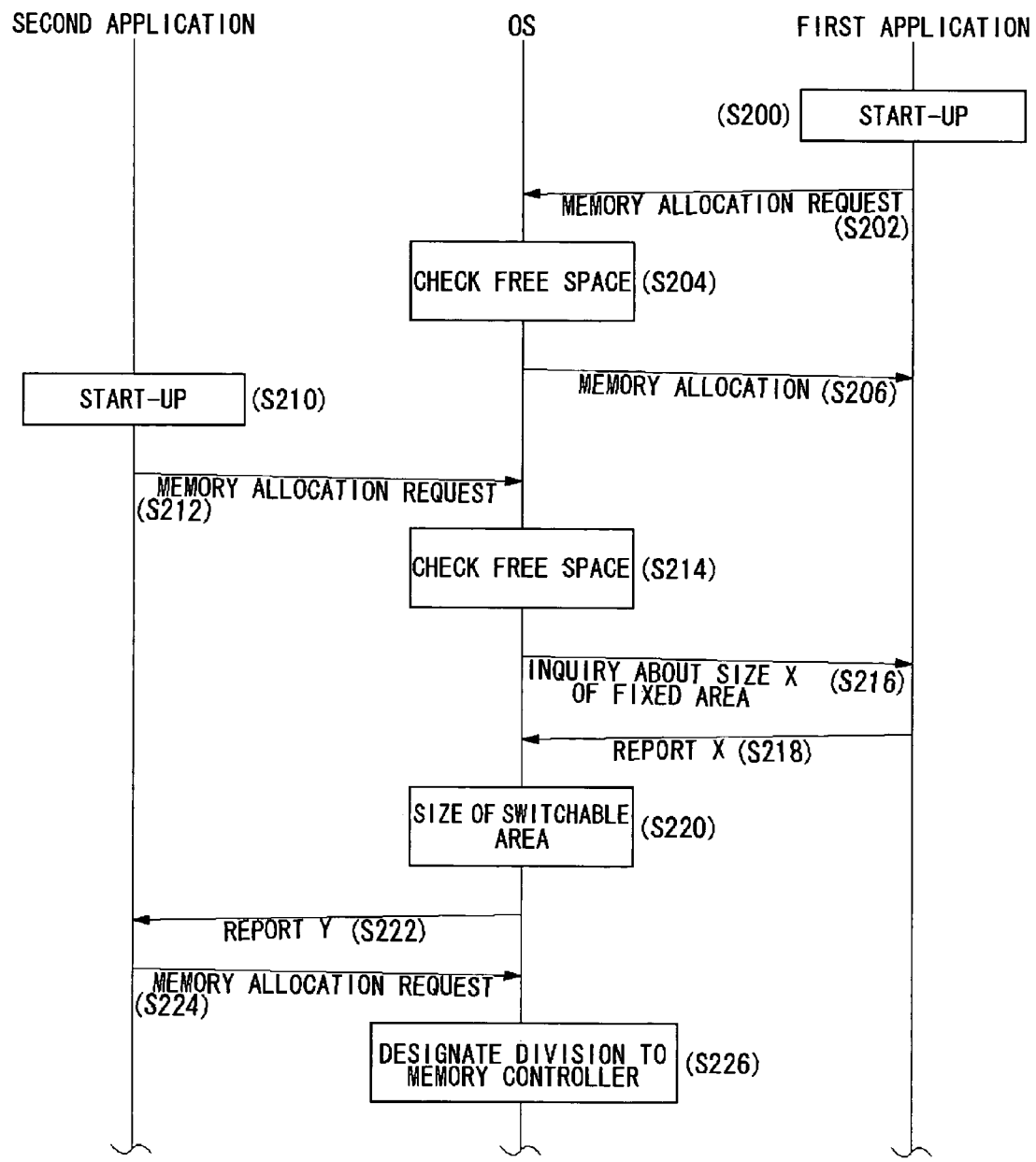
FIG. 6 is a data sequence diagram related to memory allocation between an OS and applications.

FIG. 6 is a sequence diagram for data related to memory allocation occurring between an OS and applications. Hereinafter, numerals followed by S in parentheses correspond to respective sequences in FIG. 6.

At time T0, the first application is started (S200). The first application requests the OS to allocate a predetermined size A in the graphic memory 10 (S202). The OS refers to the free space in the graphic memory 10 available at that point of time (S204). Since no other applications are started at time T0, the OS allocates the entirety of requested size to the first application (S206). The graphic memory 10 is only used by the first application until the second application is started at time T1.

At time T1, the second application is started (S210). The second application notifies the OS of the need for allocation of space in the graphic memory 10 (S212). When the memory size requested by the second application is larger than the free space in the graphic memory 10 available at that point of time, the OS examines whether the graphic memory 10 can be divided into the first area and the second area corresponding to the fixed area and the variable area, respectively (S216-S224).

The OS issues an inquiry to the first application started previously to determine the size that should be secured as the fixed area (S216). The first application responds to this inquiry with the predetermined size X of the necessary fixed area (S218).

The OS computes the size Y=M−X that remains when the size X of the fixed area for the first application is subtracted from the entire size M of the graphic memory 10 (S220). The size Y obtained as a result is reported to the second application as the size of the variable area (S222). The second application determines whether the application is executable when the size Y is allocated thereto as the variable area and responds to the OS accordingly (S224).

When the second application responds that the application can be executed, the OS designates the division of the graphic memory 10 to the memory controller 14 (S226).

After the sequences as described above, the memory controller 14 allocates the size X as the fixed area and the size Y as the variable area. Subsequently, the data corresponding to the first application is reallocated to the fixed area and the variable area depending on its contents, thus completing the division of the graphic memory 10.

When second application responds at sequence S224 that the size Y is insufficient, the OS notifies the user accordingly. Start-up of the second application is terminated. The graphic memory 10 remains undivided and continues to be used by the first application.

Referring to FIG. 5, in an interval between time T1 and time T2, the graphic processor unit 100 processes data related to the first task corresponding to the first application. In this period, both the first area and the second area of the graphic memory 10 store the data relate to the first task. Subsequently, when the main processor 200 notifies the graphic processor unit 100 of the switching to the second task corresponding to the second application, the data related to the task corresponding to the second application is written in the second area.

As described above, by prescribing, for each application, the necessary size of the fixed area as well as the size necessary for the application as a whole, the OS and the control block 20 can examine how the spaces of the graphic memory 10 should be reallocated every time a different application is started, thereby enabling efficient sharing of the graphic memory 10.

In case the information processing apparatus 1000 is a game device, applications that are expected to be executed include sub-applications like video recording applications and chat applications as well as main-applications like game. When it is expected that sub-applications are run, tasks corresponding to game application which may require real time processing may be allocated to the fixed area in preference to other tasks, regardless of the order of start-up.

Alternatively, the fixed areas required by the applications may be made to vary depending on the status of use of the graphic memory 10. More specifically, several sizes of the fixed area, associated with LOD (Level Of Detail) of image, may be prescribed for each application. When there is sufficient free space in the graphic memory 10, full-size, full-color rendering is performed. In this case, the required size of the fixed area is naturally large.

As a plurality of applications are started, the required size of the fixed area may be reduced by reducing the screen size, resolution, richness of color gradation and the like. In this case, every time an application is started, the OS places an inquiry to the application already being run so as to determine whether the LOD can be degraded and negotiate with the applications to determine the memory size that should be reserved as the fixed area or the variable area. The user may designate tolerable degradation in image quality when starting a plurality of applications.

Thus, by allowing the applications to adaptively vary the size of fixed area depending on the number of applications started, tasks corresponding to as many applications as possible can be executed and efficient sharing of a memory is achieved.

The above-described embodiment is only illustrative in nature and it will be obvious to those skilled in the art that variations in constituting elements and processes are possible within the scope of the present invention.

In the information processing apparatus 1000 according to the embodiment, the graphic processor unit 100 and the main processor 200 may be integrally fabricated as a single LSI chip or as separate chips. The blocks described in the embodiments are not limited in their level of integration. Any combination of constituting elements may be integrated or configured as a separate chip.

In the illustrative embodiment, tasks corresponding to two applications are described as being processed in a multitasking fashion. The present invention is equally applicable to a case where three or more tasks are simultaneously processed. In this case, the graphic memory 10 may be divided in space and time into two or more areas so as to reserve fixed areas allocated to the respective tasks and a variable area allocated to a plurality of tasks.

The characteristics of the present invention described in one aspect and another aspect may be specified by means of following items.

(Item 1)

The present invention according to one aspect provides a memory control method. The memory control method according to this aspect comprises dividing a memory managed by a graphic processor unit into a plurality of areas and differentiating between data related to a plurality of tasks so as to store the differentiated data in the plurality of areas.

The term "task" refers to an application programmed to achieve a given object or contents of information processing included in the application. A task may have direct correspondence with the application. Alternatively, a task may correspond to a unit smaller than the application, such as input and output control or a command designated by a user. The requirement is that a task corresponds to some sort of process or a function unit.

According to this aspect, by allocating space-divided and time-divided areas of the memory to a plurality of tasks appropriately, the memory used by the graphic processor unit can be efficiently shared by the plurality of tasks for use.

(Item 2)

The present invention according to another aspect provides a graphic processor unit. The graphic processor unit according to this aspect comprises a memory controller which divides the memory into a plurality of areas and which differentiating between data related to a plurality of tasks in the plurality of areas.

According to this aspect, by allowing the memory controller to divide the memory in time and space and allocate resultant memory areas to tasks, efficient memory management in a graphic processor unit is achieved.

(Item 3)

The present invention according to still another aspect provides a memory management method. The method according to this aspect divides a memory used by a graphic processor unit processing a plurality of tasks in a time-divided manner into a first area and a second area. The first area is used as a fixed area which stores data related to a predetermined task regardless of whether a task change occurs or not, the second area is used as a variable area which stores data related to a task processed after the change in response to a task change.

According to this aspect, the data stored in the fixed area is not overwritten in task switching. Therefore, the problem with overhead associated with data save is eliminated and task switching in a graphic processor unit is processed at a high speed. Additionally, by providing a variable area and time-dividing the variable area so as to be shared by a plurality of tasks, efficient memory management is achieved.

(Item 4)

The present invention according to yet another aspect provides a graphic processor unit. The graphic processor unit is provided with a memory controller which manages a memory by dividing the memory into a first area and a second area. The memory controller uses the first area as a fixed area which stores data related to a predetermined task regardless of whether a task change occurs or not. Meanwhile, the memory controller uses the second area as a variable area which stores data related to a task after the change in response to a task change.

According to this aspect, by allowing the memory controller in the graphic processor unit to allocate tasks to the fixed area and the variable area, to save data and to restore data, efficient memory management is achieved.

What is claimed is:

1. A memory control method comprising dividing a memory managed by a graphic processor unit into a plurality of areas and differentiating between data related to a plurality of tasks respectively corresponding to a plurality of simultaneously executed applications so as to store the differentiated data in the plurality of areas, respectively, and the data related to the task and stored in the memory includes image frame data rendered by the graphic processor and basic data referred to when rendering the image frame data.

2. An information processing apparatus comprising:
a main processor which integrally controls the apparatus as a whole; and
a graphic processor unit, wherein
the graphic processor unit comprises:
a task specifying unit which acquires information for specifying a task to be processed from the main processor;
a memory; and
a memory controller which divides the memory into a plurality of areas, and which differentiates between data related to a plurality of tasks respectively corresponding to a plurality of simultaneously executed applications and stores the differentiated data in the plurality of areas, respectively, using the information, wherein
the data related to the task and stored in the memory includes image frame data rendered by the graphic processor and basic data referred to when rendering the image frame data.

3. A graphic processor unit comprising a memory controller which divides a memory into a plurality of areas and which differentiates between data related to a plurality of tasks respectively corresponding to a plurality of simultaneously executed applications and stores the differentiated data in the plurality of areas, respectively, and the data related to the task and stored in the memory includes image frame data rendered by the graphic processor and basic data referred to when rendering the image frame data.

4. The graphic processor unit according to claim 3, wherein the memory controller allocates memory sizes required by applications corresponding to respective tasks as areas for storing data related to the respective tasks.

5. The graphic processor unit according to claim 4, wherein the memory controller allocates the areas for storing the data related to the respective tasks, in accordance with an instruction from the applications corresponding to the tasks.

6. The graphic processor unit according to claim 4, wherein the memory controller allocates the areas for storing the data related to the respective tasks, in accordance with contents of the applications corresponding to the respective tasks.

* * * * *

UNITED STATES PATENT AND TRADEMARK OFFICE
CERTIFICATE OF CORRECTION

PATENT NO. : 7,612,781 B2 Page 1 of 1
APPLICATION NO. : 11/231342
DATED : November 3, 2009
INVENTOR(S) : Washizu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1027 days.

Signed and Sealed this

Nineteenth Day of October, 2010

David J. Kappos
*Director of the United States Patent and Trademark Office*